(12) United States Patent
Meissner et al.

(10) Patent No.: US 6,924,051 B2
(45) Date of Patent: Aug. 2, 2005

(54) CONTACT HEATER/HUMIDIFIER FOR FUEL CELL SYSTEMS

(75) Inventors: Alan P. Meissner, Franklin, WI (US); Mark G. Voss, Franksville, WI (US); Gregory G. Hughes, Milwaukee, WI (US); Joseph R. Stevenson, Kenosha, WI (US); Liping Cao, Kenosha, WI (US)

(73) Assignee: Modine Manufacturing Company, Racine, WI (US)

(*) Notice: Subject to any disclaimer, the term of this patent is extended or adjusted under 35 U.S.C. 154(b) by 475 days.

(21) Appl. No.: 10/115,343

(22) Filed: Apr. 3, 2002

(65) Prior Publication Data

US 2003/0190513 A1 Oct. 9, 2003

(51) Int. Cl.⁷ ............................................... H01M 8/04
(52) U.S. Cl. ............................ 429/26; 429/34; 429/39
(58) Field of Search ............................... 429/26, 34, 39

(56) References Cited

U.S. PATENT DOCUMENTS 5,549,927 A  8/1996  Cottons et al.
2002/0086194 A1 *  7/2002  Blaszczyk et al. ............ 429/26
2004/0013918 A1 *  1/2004  Merida-Donis ............... 429/21
2004/0224191 A1 * 11/2004  Skiba ........................... 429/13

* cited by examiner

Primary Examiner—John S. Maples
(74) Attorney, Agent, or Firm—Wood, Phillips, Katz, Clark & Mortimer

(57) ABSTRACT

Degradation of membranes in fuel cells 10 due to dehydration by relatively dry incoming reactant gases is avoided through the use of a humidifier 56,58 in the incoming reactant streams, 12,14. At least one of the humidifiers 56,58 is formed in a stack 66 having alternating flow passages 68,70 with the former receiving reactant gases and including fins 102 therein and the latter receiving hot coolant from the fuel cell 10. The fins 102 in the flow spaces 68 are provided with a hydrophilic coating to foster filmwise evaporation of water introduced through a nozzle 82. The humidifier causes the reactant gas to attain a desired dewpoint before it is provided to the membranes of the fuel cell 10.

6 Claims, 6 Drawing Sheets

CONTACT HEATER/HUMIDIFIER FOR FUEL CELL SYSTEMS

FIELD OF THE INVENTION

This invention relates to heat exchangers, and more particularly, to a heat exchanger that provides the additional function of heating and humidification of a gas, such as a gaseous reactant employed in a fuel cell system.

BACKGROUND OF THE INVENTION

Concerns about pollution resulting from the operation of internal combustion engines have promoted a considerable increase in interest in fuel cell systems that produce electric power for electric motors, particularly where the electric motor is employed to provide propulsion for a vehicle. Such systems are quite complex in a number of respects. For one, the multiple components of the systems are typically required to fit into a relatively small space. Further, the weight of system components when the system is used in a vehicle must be at a minimum so as to maximize fuel efficiency. Additionally, the systems must be capable of operating efficiently, with prompt response, to a variety of loading conditions corresponding to internal combustion engine operating states such as idle, on the one hand and full power on the other as well as intermediate loadings as might be utilized in a vehicle for relatively constant speed cruising.

As is well known, the fuel cells have electrodes, one of which is subjected to gaseous fuel and another of which is subjected to a gaseous oxidant for the fuel. A typical fuel is hydrogen and a typical oxidant is the oxygen contained in air. The fuel may be molecular hydrogen provided by any of a variety of means as, for example, a source of compressed molecular hydrogen, or a hydrogen rich gas produced by catalytic processes from hydrocarbons as, for example, gasoline or diesel fuel or other organic compounds such as alcohols, most notably methanol.

Many fuel cells conventionally employ internal membranes. Such fuel cells are of the so-called PEM type and have proton exchange membranes, also referred to as polymer electrolyte membranes. The membranes, in order to perform properly, must be kept moist and must not be subjected to inordinately high temperatures. For example, in many systems contemplated today, a maximum fuel cell operating temperature is believed to be on the order of 80–85° C. if problems with membranes are to be avoided. Of course, the specific temperature will depend upon the type of material of which the membrane is made as well as other factors.

To provide proper operation of a fuel cell system, it is necessary that means be provided so that the fuel cell membranes be wetted to the proper degree to avoid damage to or shorten the life of membranes as well as to maintain a desired, high degree of efficiency of operation.

It is also highly desirable that the incoming fuel and oxidant streams be at a desired operating temperature of the fuel cell and be at a desired range of relative humidity to maximize membrane efficiency over a wide range of operating conditions of the fuel cell, particularly in applications where loading of the fuel cell varies over a substantial range.

The present invention is directed to meeting these needs.

SUMMARY OF THE INVENTION

It is the principal object of the invention to provide a new and improved fuel cell system. More specifically, it is an object of the invention to provide a fuel cell system that assures that membranes will not be dried out by the incoming gaseous reactants and that the reactant gases be delivered to the fuel cell at a desired elevated (relative to ambient) target dewpoint temperature range, typically about 63° C. It is also a specific object of the invention to provide assurance that the membranes are not subjected to undesirable drying out over a wide range of operating conditions and at the elevated temperatures at which fuel cells typically operate.

An exemplary embodiment achieves the foregoing objects in a fuel cell system that includes a fuel cell having electrodes, membranes, and a coolant flow path. A source for gaseous fuel is provided for one of the electrodes along with a source of gaseous oxidant for the fuel for another of the electrodes. The system includes a humidifier associated with the oxidant source and may include a further humidifier associated with the fuel source. At least one of the humidifiers has a stack of chambers or flattened tubes with the chambers or tubes in the stack being spaced from one another. Fins are located in the stack and extend between the chambers or flattened tubes in the spaces therebetween and are bonded thereto. A housing contains the stack and has a first inlet and a first outlet that respectively connect the chambers or flattened tubes into the coolant flow path for the fuel cell. The housing also includes a second inlet to and a second outlet from the housing which is connected between one of the sources and the corresponding one of the electrodes. The fins have a hydrophilic surface. A water injector, as for example, a spray generating device for aqueous material, is located in or adjacent to the second inlet.

As a consequence of this construction, heat rejected to the coolant by the fuel cell is also rejected to the gaseous reactant and aqueous material flowing through the humidifier whether fuel or oxidant, to the fuel cell to heat and humidify the gas, so as to provide reactant gas at a desired dewpoint temperature range and to prevent drying out of the membranes therein.

In one embodiment of the invention, the second inlet includes a diffusing manifold.

Preferably, the diffusing manifold is cone-shaped.

In a preferred embodiment, the spray generating device is at or adjacent an upstream part of the cone-shaped diffusing manifold.

The invention contemplates that the hydrophilic surface on the fins be a coating on the fins.

In one embodiment, the coating is formed by a powder of hydrophilic material.

In a highly preferred embodiment, the powder is metallurgically or mechanically bonded to the fins.

The invention further contemplates that the powder be a ceramic powder.

Preferably, the fins are serpentine fins.

A highly preferred embodiment of the invention contemplates that the chambers or tubes be chambers rather than tubes with each chamber being defined by two spaced plates with spacer bars bonded to and sealing the peripheral edges of the plates except at the first inlet and at the first outlet.

Also contemplated by the invention is a fuel cell system that includes a fuel cell, an oxygen containing gas inlet to the fuel cell and a hydrogen rich gas inlet to the fuel cell along with a coolant circuit for the fuel cell in which coolant is circulated to accept heat rejected by the fuel cell during operation thereof. The system further includes a humidifier for increasing the dewpoint of a gas entering at least one of the reactant gas inlets and which has a core including a plurality of spaced coolant flow paths. Each flow path is defined by spaced plates sealed about their edges by a first bar structure and has a coolant inlet and a coolant outlet. The coolant inlets and outlets of the coolant flow paths are connected respectively to one another by a coolant inlet manifold and a coolant outlet manifold with the manifolds being in fluid communication with the coolant circuit. Fins are disposed in the spaces between adjacent ones of the plates defining adjacent ones of the coolant flow paths which, in turn, define reactant flow paths. A second bar structure is disposed between the adjacent ones of the plates to seal the spaces between the adjacent ones of the plates. A gas inlet manifold extends to the spaces between adjacent ones of the plates and a gas outlet manifold extends from the spaces between adjacent ones of the plates. The gas outlet manifold is connected to one of the fuel cell inlets and a water injector is disposed in the gas inlet manifold. The fins have hydrophilic surfaces.

Preferably, the hydrophilic surfaces are defined by a hydrophilic coating on the fins. In a preferred embodiment, the hydrophilic coating is defined by a major percentage of a finely divided powder of metallic or metal/ceramic or ceramic material bonded to the surface of the fins by a minor percentage of braze alloy. The invention further contemplates that the major percentage is about 70 weight percent and that the minor percentage is about 30 weight percent for a metal/ceramic powder.

The invention also contemplates a humidifier for use in a fuel cell system which includes a core in the form of a rectangular solid including a plurality of spaced coolant flow paths alternating with a plurality of reactant flow paths. Each of the coolant flow paths includes a pair of spaced rectangular sheets, aligned dimples on the sheets engaging and bonded to each other and a rectangular bar structure sealing the edges of the sheets in each pair. Gaps are disposed in two opposite corners of the bar structure to define an inlet and an outlet to the space between the sheets of each pair. Each reactant flow path is defined by a space between two adjacent ones of the sheets in adjacent pairs thereof and a rectangular, undulating fin is located in such space. Two generally parallel bars, one at each of two opposite sides of the fin and extending the length thereof are provided. A hydrophilic coating is located on both sides of the fin. First and second header plates, one at each end of the core and the ends of the bars therein are also provided. Two header and tank constructions are disposed at each of the two opposite corners and open to the gaps thereat and are sealed to the bars and to the bar structure about the gaps and a water injector is near an upstream one of the header plates for injecting water into the gas flow path.

Other objects and advantages will become apparent from the following specification taken in connection with the accompanying drawings.

DETAILED DESCRIPTION OF THE PREFERRED EMBODIMENT

Exemplary embodiments of the invention will be described herein in the environment of an intended use in a vehicle and one which utilizes molecular hydrogen an anode gas and an oxygen containing reactant which is employed as a cathode gas. However, it is to be understood that the invention may be employed with efficacy in nonvehicular applications, whether or not subjected to varying loads. The humidifier of the invention may also be employed with efficacy in other fuel cell systems such as reformer type fuel cell systems that employ a liquid fuel such as methanol, ethanol, gasoline, diesel fuel, etc. or gaseous fuels such as natural gas, propane or butane, etc. to generate a hydrogen rich anode gas. In a hydrogen fuel system, a humidifier such as that made according to the invention will generally be employed to humidify both the gaseous hydrogen fuel and the gaseous oxygen containing reactant, with one humidifier being disposed on the anode inlet side and another humidifier being employed on the cathode inlet side. However, it may be used in reformer type systems as mentioned above, in which case, a humidifier will typically be employed on the oxygen containing gas side, namely, the cathode side. In those instances where the reformer type system does not additionally humidify the hydrogen rich gas supplied to the anode side of the fuel cell, a humidifier may be employed in that location as well. Consequently, the invention should not be regarded as limited to vehicular systems or molecular hydrogen fuel systems except as expressly so stated in the appended claims as it is clearly applicable to nonvehicular applications as well as other fuel cell systems, including reformer type systems.

It should also be understood that references to humidifying and increasing the dewpoint are used interchangeably and are intended to be synonymous. Further still, in many cases, but certainly not all, the humidifier will increase the temperature of the gas being humidified as it passes from the inlet to the outlet of the humidifier. But in all cases, the dewpoint of the gas is increased. Thus, references to "heating" of the gas are not intended to be limited to situations where gas exit temperature is greater than gas entry temperature. Rather, "heating" simply refers to the act of rejecting heat to the gas in the process of increasing the dewpoint of the gas as the gas travels from the inlet and the outlet.

Figure 1:
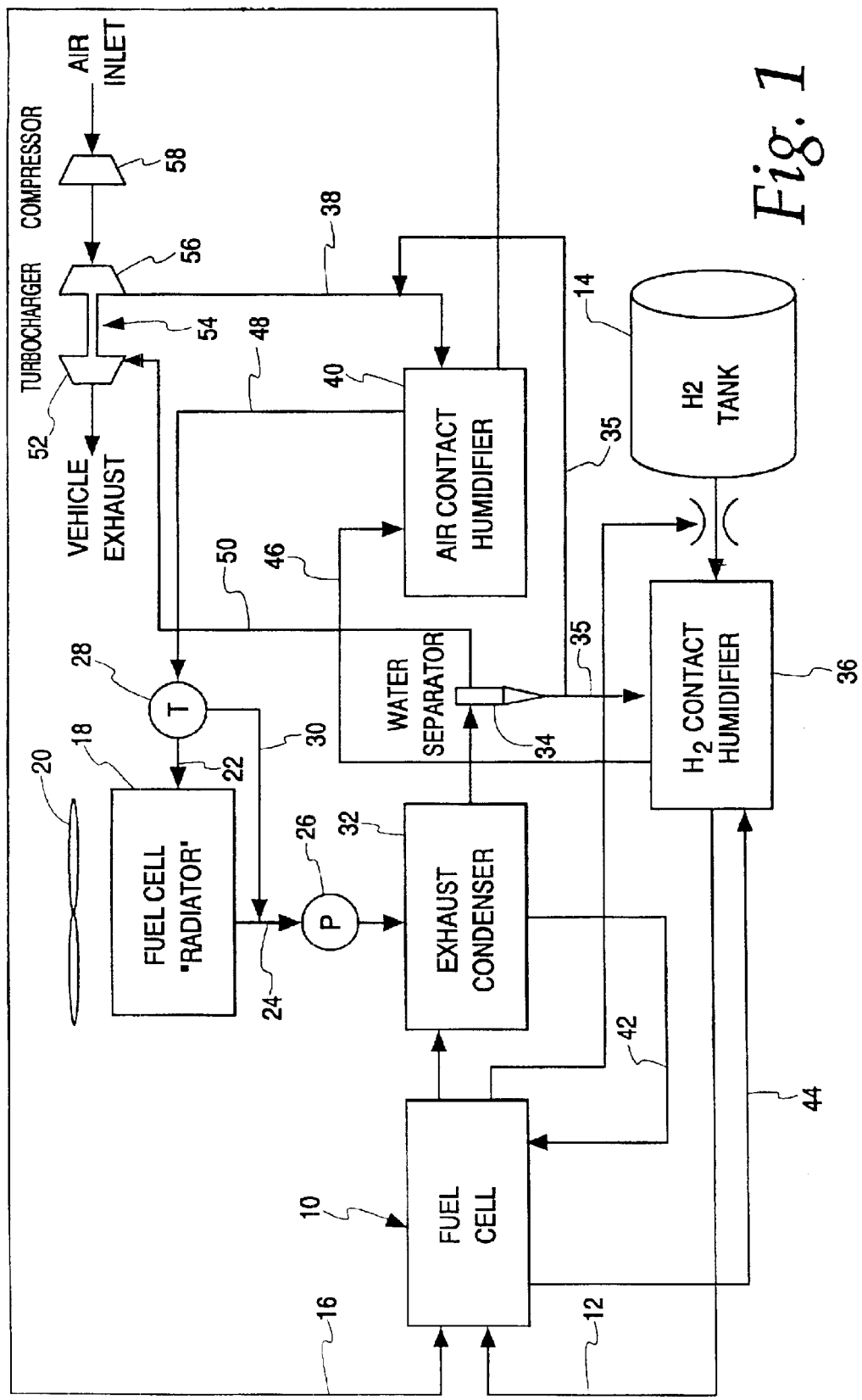
FIG. 1 is a schematic of one type of fuel cell system in which a humidifier made according to the invention may be employed.

Turning now to FIG. 1, one type of fuel cell system with which the invention may be used is illustrated in FIG. 1. This system is specifically intended to be employed in a vehicle but may be used to advantage in other environments.

The system includes a fuel cell or a plurality of fuel cells, collectively designated 10, with provision for an anode gas inlet stream on a line 12. The anode gas typically will be hydrogen or a hydrogen rich gas. When hydrogen is employed, it will be typically be stored in a pressure vessel 14.

When a hydrogen rich gas is employed, it will typically be provided from a reformer which either converts a hydrogen containing fuel such as methanol, ethanol, gasoline, etc. or a hydrogen rich fuel gas such as natural gas, propane, butane, etc. into the hydrogen rich gas. In some cases the gaseous fuel is mixed with air prior to entry into the reformer as is well known. In any event, such fuels are collectively referred to as the anode gas or as hydrogen rich gas, whether or not essentially pure hydrogen. The gaseous fuel and air may be humidified either before they are mixed (in which case, there will be two separate humidifying systems on the fuel side) or, if desired, the humidification can be performed after the fuel and air are mixed. Typically, but not necessarily, the fuel cell will include membranes, i.e., be of the PEM type.

The fuel cell 10 also includes an inlet line 16 leading to the cathode side of the fuel cell 10 through which an oxygen containing stream is received. In the usual case, the oxygen containing stream will be air.

The fuel cell 10 also includes a cooling loop for a liquid coolant. The cooling loop includes a radiator 18 through which an air stream for cooling the coolant may be driven by a fan 20. Coolant to be cooled is received on an inlet line 22 by the radiator 18 and discharged on a line 24 to a pump 26. A temperature controlled valve 28 is employed in connection with a bypass circuit 30 to bypass some or all of the coolant flow around the radiator 18 when the coolant is at a relatively low temperature and does not require cooling. The bypass circuit 30 will be employed, for example, during system start up.

The pump 26 discharges coolant through an exhaust condenser 32 which condenses water vapor from the cathode side of the fuel side 10 and passes it to a water separator 34. Liquid water separated in the water separator 34 is passed by line 35 to a hydrogen contact humidifier 36 in the line 12 as well as to an incoming air stream on a line 38 to an air contact humidifier 40. The contact humidifiers 36 and 40 are preferably humidifiers made according to the invention and will be described in greater detail hereinafter.

Coolant is circulated by the pump 26 through the exhaust condenser 32 to provide for condensation of water in the cathode exhaust as mentioned previously. From the exhaust condenser 32, the coolant is passed through a line 42 to the fuel cell to cool the same. Coolant exiting the fuel cell 10 is passed on a line 44 to the fuel contact humidifier 36 for the purpose of heating the hydrogen rich gas and causing humidification of the same before it enters the fuel cell 10 on the line 12.

From the contact humidifier 36, the coolant passes on a line 46 to the air contact humidifier 40 where it is employed to increase the dewpoint of the incoming air to a desired temperature and humidify the same to a desired humidity before the air is passed from the air contact humidifier 40 to the line 16.

From the air contact humidifier 40, the coolant is returned on a line 48 to the inlet side of the temperature controlled valve 28.

In some cases, it may be advantageous to heat and humidify the reactant gases by heat from the fuel cell 10 other than, or in addition to, the fuel cell coolant. Sources for such heat may include the fuel cell cathode air exhaust stream or the anode tail gas exhaust stream, or both. Thus fuel cell coolant and either or both of the fuel cell exhaust streams may be collectively or individually referred to as a heat exchange medium or as heat rejected by the fuel cell 10.

Gaseous exhaust from the water separator 34 is passed on a line 50 to the turbine side 52 of a centrifugal compressor, generally designated 54, to drive a centrifugal compressor 56. The centrifugal compressor 56 acts as a second stage of a compressor system having a first stage 58 which receives ambient air. The ambient air is compressed as a result of the driving of the turbine 52 by the exhaust gas from the water separator 34 with the compressed gas being placed on the line 38 to be inleted to the air contact humidifier 40. However, noncentrifugal compressor systems may be used. Indeed, in some instances where the systems are not pressurized, a compressor may be omitted.

Electrical power generated by the fuel cell 10 is employed, during operation, to drive the pump 26 and the compressor 58 as well as motors, etc. that may be located within the system and to provide electric power for the load to be driven by the system. For startup, battery power may be used. In a vehicular application, the load typically will be an electric motor coupled to the vehicle traction system.

As generally alluded to previously, the contact humidifiers 36,40, are for the purpose of respectively humidifying anode and cathode gases so that membranes (not shown) within the fuel cells 10 and associated with those electrodes are not dried out as well as to deliver the reactant gases placed on the anode and cathode via the lines 12 and 16 at a desired dewpoint. Thus, aqueous material from the water separator 34 is delivered to the contact humidifiers 36,40 and thus to the incoming streams of reaction gases to those humidifiers 36,40. Humidification with the humidifiers 36,40 is enhanced by the heat rejected by the fuel cell 10 to the heat exchange medium and reactant gases received in each from the heat exchange medium delivered from the fuel cells 10. Such rejected heat may also be used to elevate the dewpoint temperature of the reaction gases to the desired temperature of the fuel cell 10 as mentioned previously.

In some cases, to assure that the required humidity and temperature specification for the reactant gases are met, two humidifiers may be linked in series on one or the other or both the fuel stream side and the oxidant stream side.

The humidifiers 36,40 may be, but need not be, identical. The construction of the same is illustrated in FIGS. 2-5, inclusive.

Figure 2:
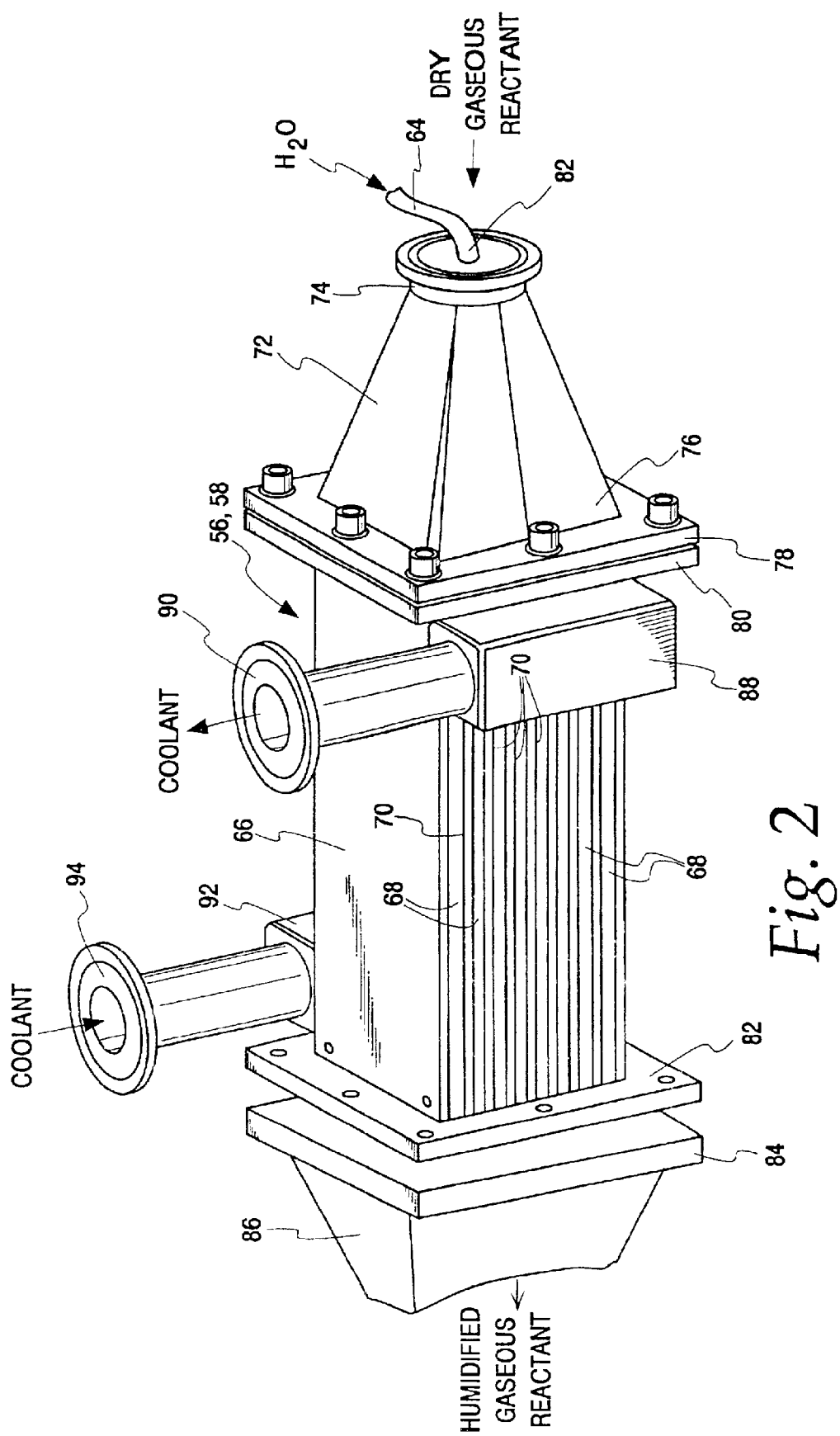
FIG. 2 is a partially fragmentary, perspective view of a preferred embodiment of a humidifier.

Referring to FIG. 2, a typical one of the humidifiers 36,40 is seen to include a rectangular stack or core 66 of alternating flow passages 68,70. The flow passages 68, as will be seen, receive a dry gaseous reactant from an inlet in the form of a conical or pyramid-shaped (the terms are used interchangeably) diffusing manifold 72. The diffusing manifold has a narrow inlet end 74 and an enlarged outlet end 76 terminating in a plate 78 which in turn is bolted and sealed to a plate 80 on one end of the stack 66. A line 35 (FIG. 1) from the water separator 34 extends to the inlet end 74 to be adjacent to or partly within the inlet 74 to terminate in a nozzle 82. A water pump (not shown) may be included at the outlet of the separator 34. The nozzle 82 may be of any desired type which provides a very fine spray of aqueous material into the diffusing manifold 72 whereat it may spread and be entrained with the dry gaseous reactant that enters the diffusing manifold 72. Those skilled in the art will recognize that means other than a nozzle 82 may be utilized to direct to the aqueous material into the diffusing manifold 72 and need not provide a "spray" in the narrow sense of the word. Thus, as used herein, the term "nozzle" should be considered to be inclusive of any water dispersing or injecting device and that the phrase "very fine spray" is intended to encompass any very fine dispersal of the aqueous medium in the incoming reactant gas.

The core 66 terminates at an opposite end in a plate 82 which may be bolted and sealed to a similar plate 84 which forms part of a conical or pyramid-shaped outlet manifold 86 for the heated and humidified gaseous reactant. The manifold 86 is connected to the inlet line 12 or 16 for the fuel cell 10 (FIG. 1).

At one side of the stack 66, adjacent the plate 80, an elongated coolant outlet manifold 88 which terminates in an appropriate fitting 90 is provided. Diagonally opposite of the manifold 88 is an inlet manifold 92 which also terminates in a similar fixture 94. However, the manifolds 88,92 could be on the same side of the core 66 if desired.

The manifolds 88 and 92 are in fluid communication with the flow paths 70 while the diffusing manifold 72 and outlet manifold 86 are in fluid communication with opposite ends of the flow paths 68. It will be appreciated from the direction of the flows indicated in FIG. 2 that countercurrent flow occurs within the core 66.

Figure 3:
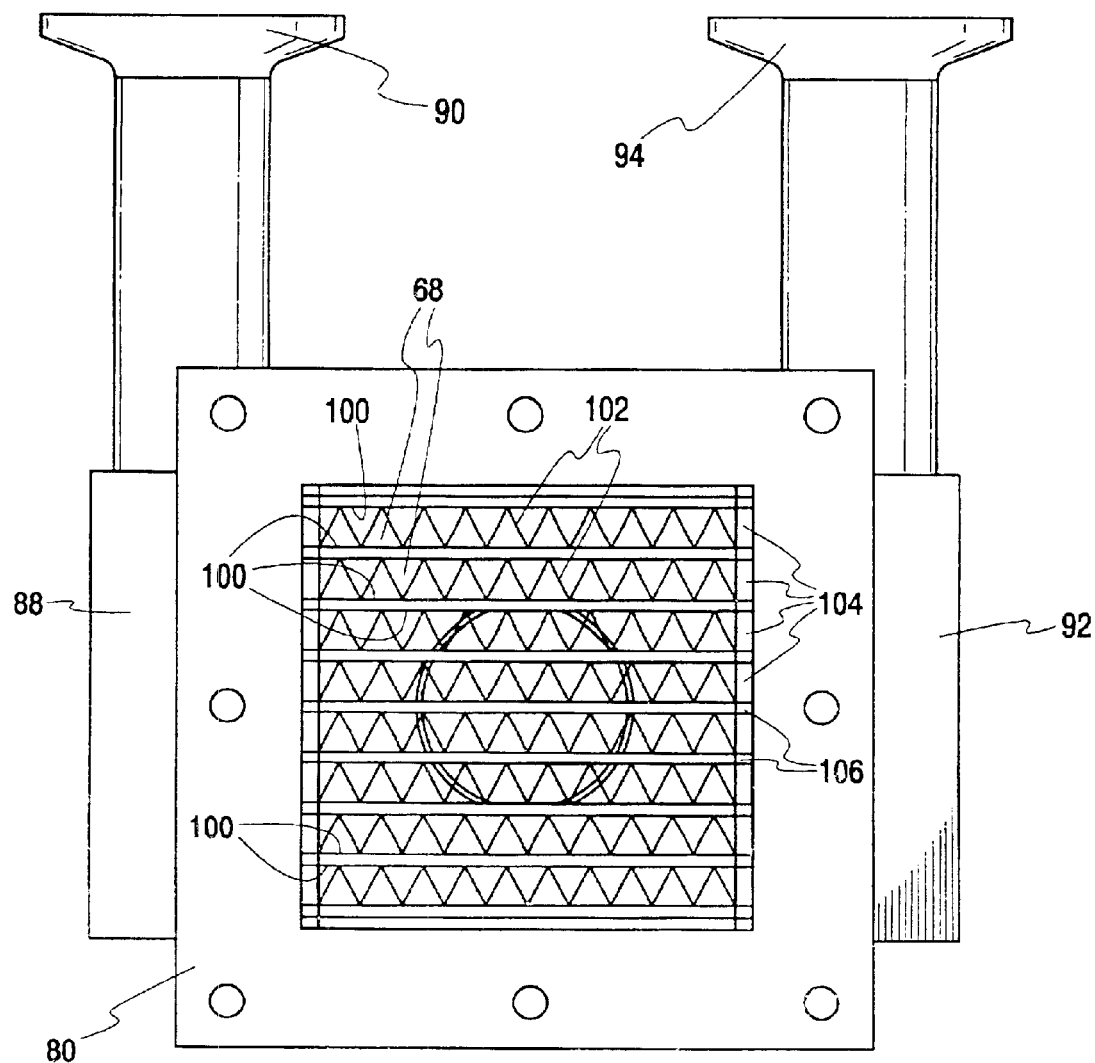
FIG. 3 is an end elevation of the humidifier with the inlet manifold removed.
Figure 4:
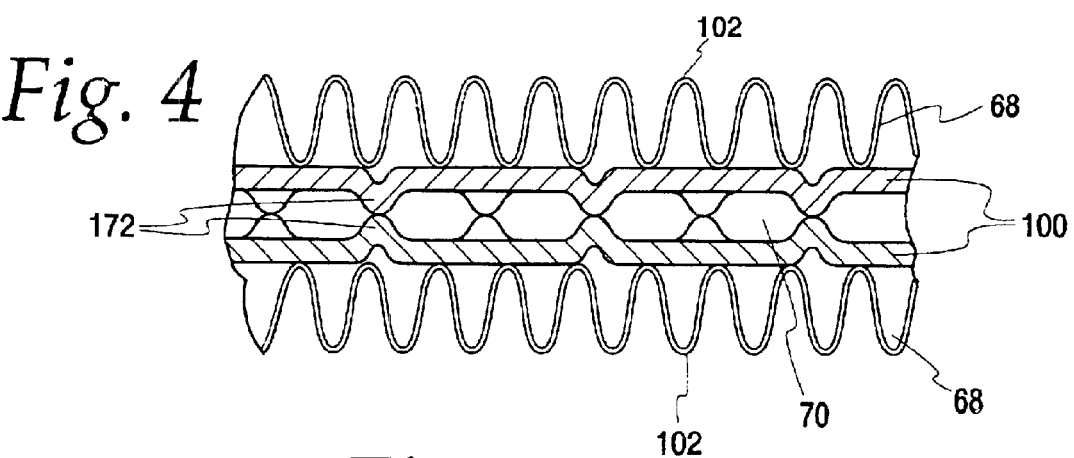
FIG. 4 is an enlarged, fragmentary view of flow passages within the humidifier.
Figure 5:
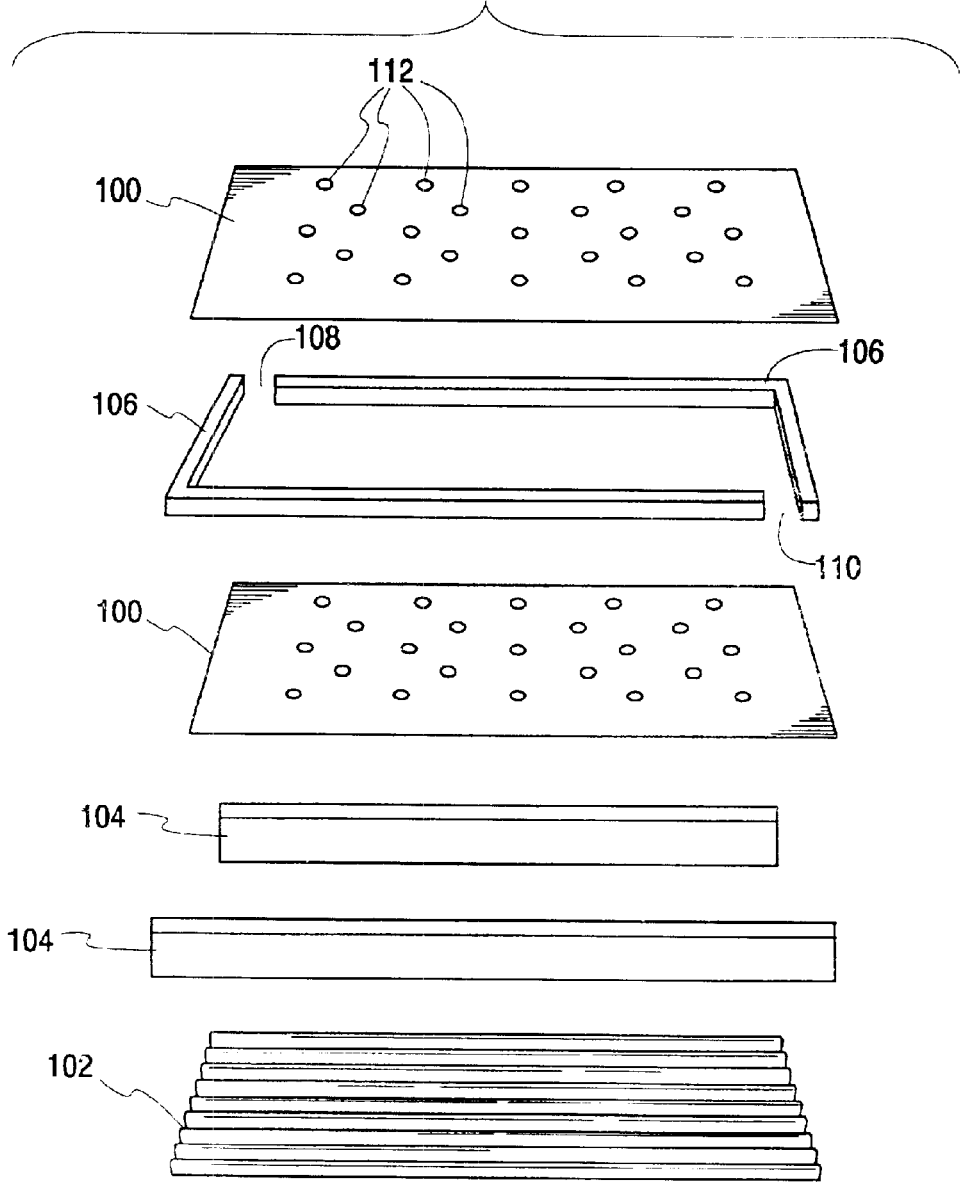
FIG. 5 is an exploded view of components employed in fabricating the humidifier core.

Turning now to FIGS. 3–5, inclusive, the innards of the core 66 will be described in greater detail. As seen in those figures, the gas flow paths 68 are each defined by the space between two plates 100. Within this space is a fin, and specifically, a conventional louvered fin 102. While offset strip or plain fins could be used, it is preferred to employ serpentine fins as the fins 102 and at a relatively high density, as, for example 24 fins per inch or more as conventionally contacted.

As best seen in FIGS. 3 and 5, relatively tall flanges in the form of bars 104 flank opposite sides of each fin 102 along its entire length and are bonded and sealed, as by brazing, to the adjacent ones of the plates 100 at their peripheries. The bars 104 thus provide a flange structure that defines the exterior sides of the core 66 that extends between the plates 80 and 82 (FIG. 2) allowing the gaseous reactant and the water to flow through the fin 102 from right to left therein as viewed in FIG. 5.

The plates 100 are paired as can be ascertained from FIG. 3 and at their peripheries and their ends are sealed and bonded to one another as by brazing by L-shaped flange structures shown as formed by bars 106 as illustrated in FIG. 5. The flange structures 106 have a considerably lesser height than the flange structures 104 and may be formed of two or more pieces if desired. Alternatively, the bars 104 and/or 106 can be replaced by flanges formed on the plates 100. It is to be particularly noted that at opposite corners of the stack 66, openings 108 and 110 exist between each of the flange structures 106. For the orientation of components shown in FIGS. 2 and 5, the openings 108 serve as an inlet to the space between the flange structures 106 and the plates 100 bonded thereto while the openings 110 serve as an outlet from that same area. The manifold 92 is sealed to the core so as to be aligned with the spaces 108 in each of the bar structures while the manifold 88 is similarly aligned with and bonded to receive coolant from the openings 110 in each of the bar structures 106.

It will also be seen that each of the plates 100 includes a plurality of dimples 112 that are offset from one another in adjacent rows from one end to the other of each of the plates 100. As seen in FIG. 4, the dimples 112 in the uppermost plate of two plates 100 separated by the bar structures 106 extend downwardly while the dimples 112 on the lowermost one of the plates 100 extend upwardly and abut the corresponding downwardly extending dimples 112. In the preferred embodiment, the dimples 112, where they contact, are brazed to each other and together with the bar structures 106 provide the flow paths through which fuel cell coolant passes. If desired, the dimples 112 may be eliminated in favor of other means. For example, flow directors in the form of a maze of bars, ribs or offset strip fins and of sufficient strength to prevent internal pressures from distorting the plates 100 could be used to promote uniform flow if desired. Generally, the selection of dimples or flow directors will be dependent upon pressure drop and heat transfer considerations. Where low pressure drops are required, generally dimples will be preferable to a maze of flow directors or fins.

In the usual case, highly corrosion resistant material such as various types of stainless steel will be used for all of the components described thus far. This provides a high degree of inertness of the components to prevent contamination of fuel cell components. The various parts described above are all brazed together to provide the desired sealing so as to isolate the flow paths 68 from the flow paths 70 and vice versa. Brazing also serves to isolate the flow paths 68,70 from the exterior of the humidifier. In brazing such materials, fluxless brazing processes, such as vacuum brazing, are typically employed. Nonetheless, the invention is not limited to a construction made of highly inert material such as stainless steel and/or fluxless brazing processes. In some cases, for example, aluminum or other nonferrous materials such as copper or brass, or even plastics of relatively high strength and having good thermal conductivity could be employed.

The fins 102 are fabricated to have hydrophilic surfaces on both sides. Preferably both sides of the fins 102 are provided with a hydrophilic coating. The presence of a hydrophilic coating assures that the fins 102 are thoroughly wetted and that filmwise evaporation of the aqueous material into the reactant gas occurs. The hydrophilic coating may be of the type disclosed, for example, in commonly assigned U.S. Pat. No. 5,549,927 issued Aug. 27, 1996 to Cottone et al. The entire disclosure of that patent is herein incorporated by reference. It will be noted that in utilizing the coatings therein disclosed, the described flux can typically be omitted and that nonaluminum materials are preferred to provide chemical compatibility and reliability.

Generally speaking, the coating applied will be a finely divided, generally spherical metal or ceramic or metal/ceramic powders mechanically or metallurgically bonded to the fins 102 by a high temperature nickel braze alloy. Typically, in order to obtain a maximum hydrophilicity of the surfaces of the fin 102 together with good adherence of the hydrophilic powder to the substrate, namely, the fin 102, metal/ceramic powder will be present at a weight percent of approximately 70% while a high temperature nickel braze alloy will be present at a weight percent of about 30%. Where a metal powder is employed, the metal will typically be employed at the weight percentage of approximately 98% with the brazing alloy constituting a weight percent of about 2%. Preferably, for metal powders, the weight percent of the metal will be in the range of 90–98% with the balance being braze alloy. Where ceramic powders are used, the ceramic powder will be present in the range of 50–60% while the braze metal will account for the balance. In general, a metal/ceramic powder will be present in the range of about 69–82 weight percent and the braze alloy present in the range of about 18–31 weight percent.

Where hydrophilicity must be increased, the ratio of powder to braze alloy may be increased at the expense of decreased adherence. Conversely, when better adherence is required, the ratio may be decreased which will result in decreased hydrophilicity. In short, there is no magic in the preferred ratios stated. The ratio simply represents the ratio that Applicants have found maximizes both hydrophilicity and adhesion for the types of powder contemplated.

In applying the coating, it is frequently desirable to include a vaporizable organic binder to hold the other components that ultimately form the coating in place until metallurgical and/or mechanical bonding occurs. The precise amount of volatile organic binder is not particularly critical in that the same is burnt off or vaporized in the assembly process.

A highly preferred composition for the hydrophilic coating is set forth in Table 1 below.

TABLE 1

| Coating Components | Chemical Identification | % wt |
|---|---|---|
| Component 1 - Metal-Ceramic | Ni—Cr—Al—Co—Y Oxide Composite | |
| | Aluminum | 5.5 |
| | Cobalt | 2.5 |
| | Yttrum Oxide | 0.5 |
| | Silicon | 1 |
| | Manganese | 2 |
| | Chromium | 17.5 |
| | Iron | 0.5 |
| | Nickel | 67 |
| | Organic Binder | 3.5 |
| Component 2 - | High Temp Nickel Braze Alloy | |
| BNi-5 Braze Alloy | Chromium | 19 |
| | Boron | *See Below |
| | Silicon | 10.2 |
| | Iron | — |
| | Nickel | Balance |
| | Cobalt | 0.10 max |
| | Carbon | 0.06 max |
| | Aluminum | 0.05 max |
| | Titanium | 0.05 max |
| | Zirconium | 0.05 max |
| | Boron | *0.03 max |
| | Phosphorous | 0.02 max |
| | Sulfur | 0.02 max |
| | Selenium | 0.005 max |
| | O2 | 0.03 max |
| | N2 | 0.03 max |
| Component 3 - Braze Binder | Volatile Organic Binder | 100 |

Other coatings that may be used are shown in Tables 2 and 3 below.

TABLE 2

| Coating Components | Chemical Identification | % wt |
|---|---|---|
| Component 1 - Metal-Ceramic | Ni—Cr—Al—Co—Y Oxide Composite | |
| | Aluminum | 5.5 |
| | Cobalt | 2.5 |
| | Yttrum Oxide | 0.5 |
| | Silicon | 1 |
| | Manganese | 2 |
| | Chromium | 17.5 |
| | Iron | 0.5 |
| | Nickel | 67 |
| | Organic Binder | 3.5 |
| Component 2 - | High Temp Nickel Braze Alloy | |
| BNi-2 Braze Alloy | Chromium | 7 |
| | Boron | *3.1 |
| | Silicon | 4.5 |
| | Iron | 3 |
| | Nickel | Balance |
| | Cobalt | 0.10 max |
| | Carbon | 0.06 max |
| | Aluminum | 0.05 max |
| | Titanium | 0.05 max |
| | Zirconium | 0.05 max |
| | Boron | *per above |
| | Phosphorous | 0.02 max |
| | Sulfur | 0.02 max |
| | Selenium | 0.005 max |

TABLE 2-continued

| Coating Components | Chemical Identification | % wt |
|---|---|---|
| | O2 | 0.03 max |
| | N2 | 0.03 max |
| Component 3 - Braze Binder | Volatile Organic Binder | 100 |

TABLE 3

| Coating Components | Chemical Identification | % wt |
|---|---|---|
| Component 1 - Powder Met 316LSS | 316L SS Powder Metal | |
| | Chromium | 17.03 |
| | Carbon | 0.026 |
| | Iron | Balance |
| | Nickel | 12.9 |
| | Silicon | 0.95 |
| | Manganese | 0.17 |
| | Molybdenum | 2.17 |
| | Columbium | — |
| | Phosphorous | 0.01 |
| | Sulfur | 0.009 |
| Component 2 - | High Temp Nickel Braze Alloy | |
| BNi-5 Braze Alloy | Chromium | 19 |
| | Boron | *See Below |
| | Silicon | 10.2 |
| | Iron | — |
| | Nickel | Balance |
| | Cobalt | 0.10 max |
| | Carbon | 0.06 max |
| | Aluminum | 0.05 max |
| | Titanium | 0.05 max |
| | Zirconium | 0.05 max |
| | Boron | *0.03 max |
| | Phosphorous | 0.02 max |
| | Sulfur | 0.02 max |
| | Selenium | 0.005 max |
| | O2 | 0.03 max |
| | N2 | 0.03 max |
| Component 3 - Braze Binder | Volatile Organic Binder | 100 |

Of course, as alluded to previously, finely divided metal powders may be utilized as well if they have hydrophilic properties. Metals powders also adhere better. See table 3 above. Ceramic/metal coatings are preferred, however, in spite of their lesser adhesion characteristics, because of their inert nature.

In the usual case, a target fin surface loading of about 150–200 grams per square meter is preferred. However, higher loading may be tolerated. In some cases lower loadings may also be tolerated depending upon the degree of hydrophilicity desired.

It is desired that the load be consistently applied by a dipping process to result in a thickness of about 0.001"–0.0015" on both surfaces of the fin.

It is further desired that the coating application be such that it is nonobtrusive to flow of aqueous humidifying material and reactant gas through the fins 102, which is to say that less than 10% of the fin channels on one side are plugged by the coating.

It is also desired that the crests of the fins, that is, where the strip forming the fin reverses direction to provide the undulating fin, be nonobtrusive to assembly which is to say that the same will metallurgically bond firmly to the adjacent plate 100 to assure good heat conduction between the fin 102 and the plates 100. This requires that the exterior surfaces, that is convex surfaces of the peaks of the fin be completely uncoated.

To obtain the foregoing, a fin section is degreased and may be weighed off line. Thereafter, the fin section is submerged in a slurry of continuously mixed hydrophilic coating (metal, ceramic or metal/ceramic powder), braze powder alloy, and volatile organic binder.

The fin section is then removed from the slurry and allowed to drain momentarily. This is followed by flowing a light current of air over the fin to distribute the slurry consistently over the depth of the fin. After that has occurred, the fin peaks, that is, the exterior sides of the crests, are wiped clean of slurry. This can be accomplished by a rag or, if desired, by sanding after the slurry has dried.

Finally, assuming that the cleaning of the fin peaks has occurred before the drying of the slurry, the fin sections are dried at 110° C. and the weight is checked to assure the desired loading has been obtained.

The foregoing sequence of steps is not intended to be limiting, but rather, to disclose the best mode of coating application presently contemplated by the inventors.

In some cases, the slurry can be sprayed on or rolled onto the fin but dipping is preferred.

The organic binder is not particularly critical. The same should be used in sufficient quantity that adhesion prior to final assembly of the humidifier is not compromised. At the same time, the binder should be one that will totally thermally degrade, with little residue, at the brazing temperatures of concern as, for example, a temperature of 600° C. for a stainless steel construction. Furthermore, when the coating is applied by dipping, the slurry should have a viscosity in the approximate range of 2–3 centipoise at 70° F. (with the powders in full suspension within the binder) so as to achieve the desired loading of the powders when applied by dipping, even after the slurry has had an opportunity to partially run off of the fin after dipping. Of course, other viscosities might be appropriate where the coating is applied by means other than dipping as, for example, spraying or rolling. Materials such as acrylics, propylene glycol monomethyl ether acetate and other acetates, and n-propyl bromide, and mixtures thereof are generally satisfactory for the binder.

The components of the core 66 are assembled to the configuration described above and shown in the drawings with fixtures as required and then subject to a brazing operation, usually vacuum brazing to eliminate the need for flux. Brazing causes the components to bond together and seal the various interfaces of the components. The brazing operation also degrades the organic binder of the coating without any appreciable residue. At this time, the braze alloy in this coating comprehends any metallic brazing alloy which metallurgically or mechanically bonds the hydrophilic metal, metal ceramic or ceramic powder to the fins 102. However, any material that will metallurgically or mechanically bond the powder to the substrate may be used.

The resulting core may then be cooled and the plates 80,82, other suitable connection means, and the header and tank assemblies 88,92 affixed to the core 66 by any suitable means. Welding may be employed for this purpose.

In some instances, heat transfer enhancements may be employed within the flow paths 70, that is, the coolant flow paths.

Figure 6A:
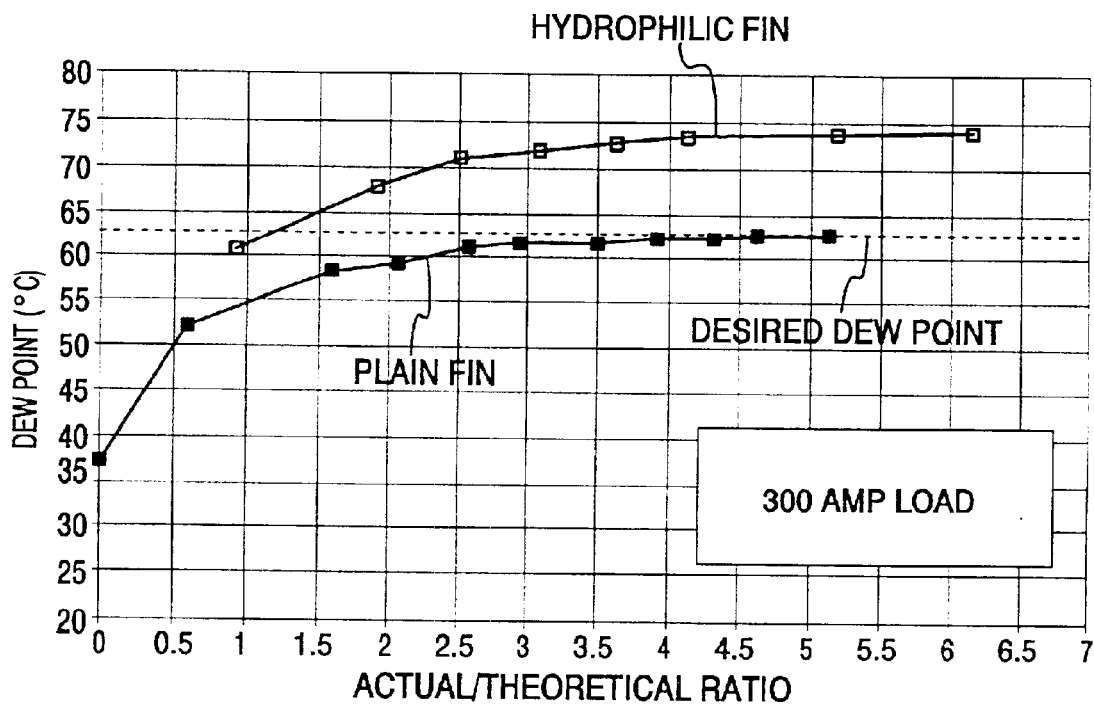
FIGS. 6a–6c are comparative graphs of performance.
Figure 6B:
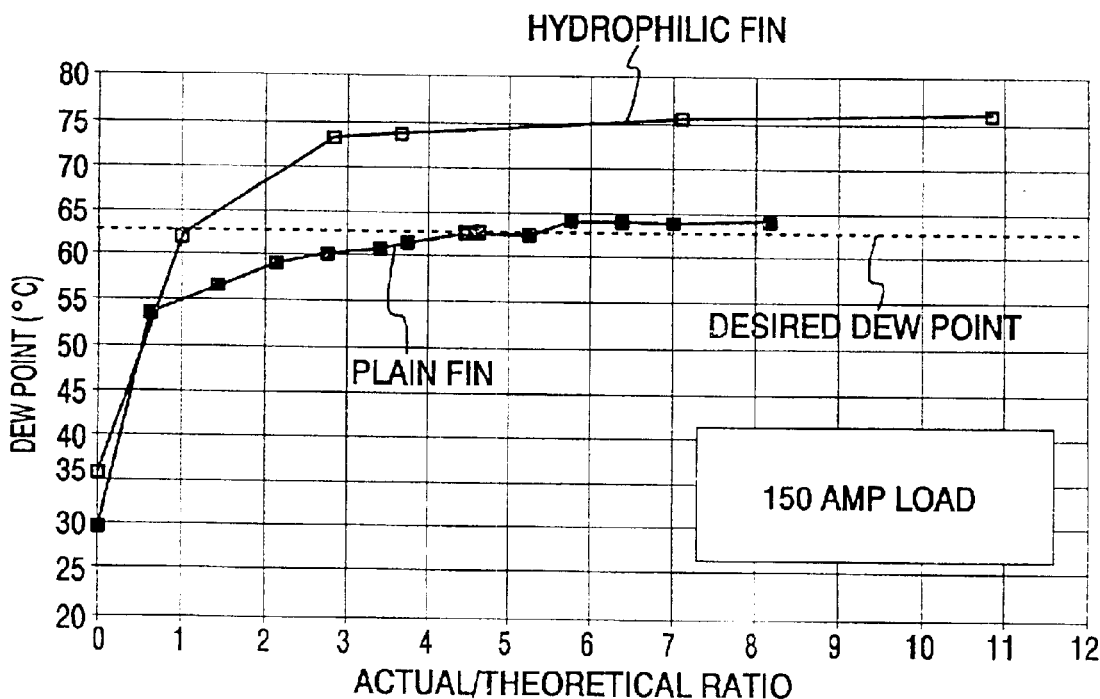
Figure 6C:
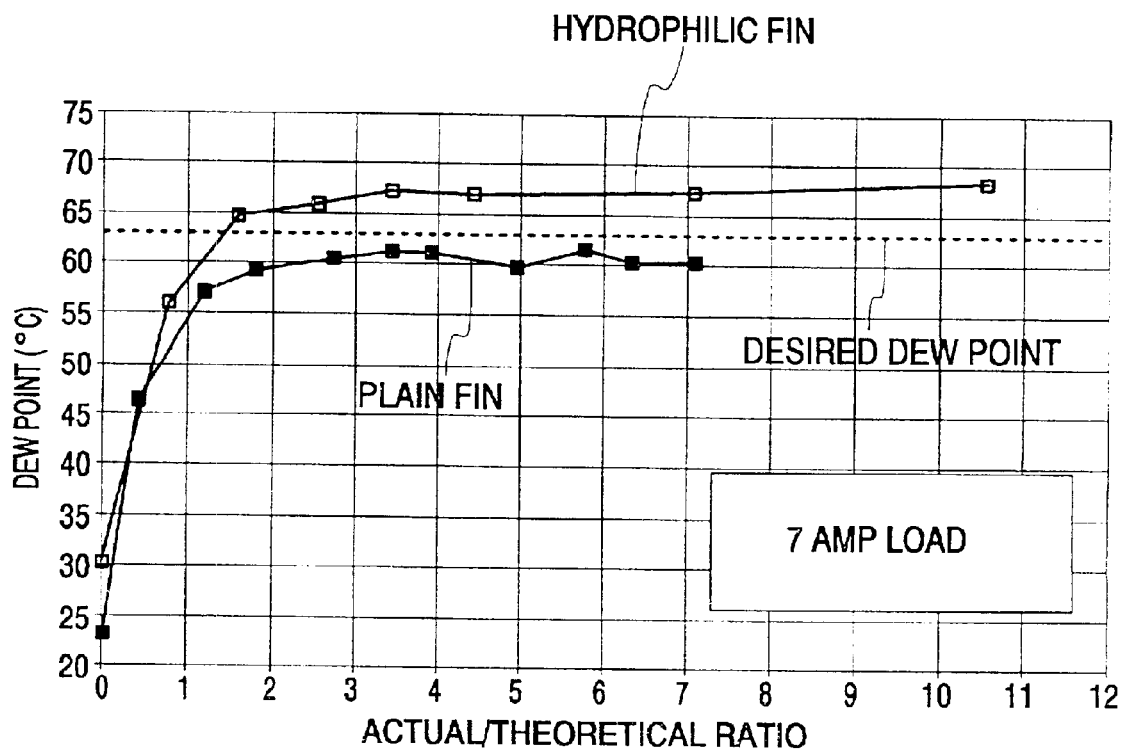

It has been found that a coating having the composition set forth in Table 1 above and applied as disclosed above provides superior results in terms of obtaining the desired dewpoint of the reactant gases. In one test, where the reactant gas temperature was to be in the range of about 63–82° C. and the minimum humidification for the reactant gases provided to the fuel cell 10 was a humidified reactant gas having a dewpoint of 63° C., the desired humidification was reached over a wide range of fuel cell loadings. An otherwise identical humidifier but with plain fin surfaces, i.e., conventional fins lacking a hydrophilic surface was also tested. Comparative results are illustrated in FIGS. 6a, 6b and 6c at three different fuel cell loadings. The Y axis of these figures depicts the dewpoint of the reactant gas in ° C. The X axis represents the ratio of the actual amount of water sprayed into the humidifier to obtain a 63° C. dewpoint in actual practice to the theoretical amount of water required to obtain the same 63° C. dewpoint.

The results may be summarized as follows. For a 300 ampere load on the fuel cell 10, the desired dewpoint was reached with a humidifier made according to the invention at an actual to theoretical ratio of about 1.25 whereas the same dewpoint was not reached with a plain fin humidifier until actual to theoretical ratios of four or more were reached.

At an 150 ampere load, the humidifier with a fin having a hydrophilic surface provided a dewpoint substantially equal to the desired dewpoint at a actual/theoretical ratio of about one whereas the plain surface humidifier did not reach the desired dewpoint until the actual/theoretical ratio was five or more. Finally, at a seven ampere loading, the humidifier with a hydrophilic fin attained the desired dewpoint at an actual/theoretical ratio of about 1.5 whereas the humidifier with the plain fin approached, but did not attain, a 63° C. dewpoint even up to actual/theoretical ratios in excess of seven.

The hydrophilic fin thus provides an extended wetting surface which allows more liquid phase aqueous material to be vaporized at a temperature nearing that of the cooling circuit, i.e., provides greater mass transfer at or near fuel cell operating temperatures.

Quite clearly, the foregoing results demonstrate the superiority of employing a hydrophilic surface on the fins of the humidifier. This superiority is recognized, at the very least, in terms of improved efficiency in that less pumping power is required to deliver the water to the humidifiers since the humidifier with the hydrophilic fin of the invention operates at or close to the theoretical water addition point needed to attain the desired dewpoint whereas the plain fin humidifier does not, requiring instead a significantly greater quantity of water to be sprayed into the plain fin humidifier to achieve, or almost achieve, the desired dewpoint.

Therefore, it will be appreciated that the invention provides an ideal means of assuring adequate humidification of membranes in the fuel cells to avoid their drying out in such a way that their life would be shortened and/or the membrane's efficiency lowered. It will also be appreciated that a humidifier having hydrophilic fins made according to the invention provides the desired humidification over a wide range of operating conditions, as is clearly apparent from the comparisons evidenced by FIGS. 6a–6c, inclusive.

Moreover, the humidifier of the invention is quite compact, ideally suiting it for those applications where compactness is required as, for example, in vehicular applications. In one embodiment of the invention, the size of the core 66 may be made as a rectangular solid approximately 3"×3"×8" for a fuel cell system with a rated net electrical output of 75 kilowatts. This compactness also provides weight advantages insofar as the weight of the assembly will be less than a comparably constructed assembly of greater volume. Similarly, material costs are reduced over larger assemblies, thereby providing an economic advantage.

What is claimed is:

1. In a fuel cell system, the combination of:

a fuel cell;

an oxygen containing gas inlet to said fuel cell;

a hydrogen rich gas inlet to said fuel cell;

said fuel cell acting as a source for a heat exchange medium having heat rejected by said fuel cell during operation thereof; and a humidifier for humidifying gas entering at least one of said gas inlets and having a core including a plurality of spaced heat exchange medium flow paths, each flow path being defined by spaced plates sealed about their edges by a first bar structure and having a heat exchange medium inlet and a heat exchange medium outlet, the heat exchange medium inlets and outlets of said heat exchange medium flow paths being connected respectively to one another by a heat exchange medium inlet manifold and a heat exchange medium outlet manifold with at least said inlet manifold in fluid communication with said fuel cell, and fins disposed in the spaces between adjacent ones of the plates defining adjacent ones of said heat exchange medium flow paths, a second bar structure between said adjacent ones of said plates and sealing said spaces between said adjacent ones of the plates, a gas inlet manifold from said spaces between adjacent ones of the plates, a gas outlet manifold from said spaces between adjacent ones of said plates, said gas outlet manifold connected to one of said fuel cell inlets and a water injector in said gas inlet manifold, said fins having hydrophilic surfaces.

2. The fuel cell system of claim 1 wherein said hydrophilic surfaces are defined by a hydrophilic coating on said fins.

3. The fuel cell system of claim 2 wherein said hydrophilic coating is defined by a major percentage of a finely divided powder of metallic or metal/ceramic material bonded to surfaces of the fins by a minor percentage of braze alloy.

4. The fuel cell system of claim 3 wherein said powder is a metal/ceramic material and said major percentage is about 70 weight percent and said minor percentage is about 30 weight percent.

5. The fuel cell system of claim 1 wherein said fuel cell has a coolant circuit for a coolant, said coolant serving as said heat exchange medium.

6. In a fuel cell system, the combination of:

a fuel cell;

an oxygen containing gas inlet to said fuel cell;

a hydrogen rich gas inlet to said fuel cell;

said fuel cell acting as a source for a heat exchange medium having heat rejected by said fuel cell during operation thereof; and a humidifier for humidifying gas entering at least one of said gas inlets and having at least one heat exchange medium flow path with an inlet and an outlet, and at least one wall defining a gas flow path having an inlet and an outlet, said outlet from said gas flow path being connected to one of said fuel cell inlets;

a water injector proximate said inlet for said gas flow path; and at least one fin in said gas flow path, said fin(s) having a hydrophilic surface.

* * * * *

UNITED STATES PATENT AND TRADEMARK OFFICE
CERTIFICATE OF CORRECTION

| | | |
|---|---|---|
| PATENT NO. | : 6,924,051 B2 | Page 1 of 1 |
| APPLICATION NO. | : 10/115343 | |
| DATED | : August 2, 2005 | |
| INVENTOR(S) | : Alan P. Meissner et al. | |

It is certified that error appears in the above-identified patent and that said Letters Patent is hereby corrected as shown below:

Column 13, line 26, delete "from" and substitute therefor --to--.

Signed and Sealed this

Third Day of April, 2007

JON W. DUDAS
*Director of the United States Patent and Trademark Office*